(12) United States Patent
Skjonnemand

(10) Patent No.: US 7,456,918 B2
(45) Date of Patent: Nov. 25, 2008

(54) COMPENSATED LIQUID CRYSTAL DISPLAY OF THE BEND MODE

(75) Inventor: Karl Skjonnemand, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 487 days.

(21) Appl. No.: 10/531,590

(22) PCT Filed: Sep. 25, 2003

(86) PCT No.: PCT/EP03/10645

§ 371 (c)(1), (2), (4) Date: Apr. 18, 2005

(87) PCT Pub. No.: WO2004/036301

PCT Pub. Date: Apr. 29, 2004

(65) Prior Publication Data

US 2006/0033850 A1   Feb. 16, 2006

(30) Foreign Application Priority Data

Oct. 18, 2002  (EP) .................................. 02023372

(51) Int. Cl.
*G02F 1/1335*   (2006.01)

(52) U.S. Cl. ...................................... 349/118; 349/119
(58) Field of Classification Search .......... 349/117–119
See application file for complete search history.

(56) References Cited

U.S. PATENT DOCUMENTS

| 5,504,603 A * | 4/1996 | Winker et al. ............... 349/117 |
| 5,619,352 A | 4/1997 | Koch et al. |
| 6,380,996 B1 | 4/2002 | Yoji et al. |
| 6,903,789 B1 * | 6/2005 | Cutler et al. ................ 349/119 |
| 2001/0030726 A1 | 10/2001 | Yoshida et al. |
| 2002/0063828 A1 | 5/2002 | Negoro et al. |

FOREIGN PATENT DOCUMENTS

| WO | WO 0120393 | 3/2001 |
| WO | WO 02/08822 | 1/2002 |

* cited by examiner

*Primary Examiner*—Dung T. Nguyen
(74) *Attorney, Agent, or Firm*—Millen, White, Zelano & Branigan, P.C.

(57) ABSTRACT

The invention relates to a compensated liquid crystal display (LCD) of the bend mode, in particular of the optically compensated bend (OCB) or pi-cell mode, and to a compensator for use in an LCD of the bend mode. The compensator comprises at least an A-plate, an O-plate and a negative C-plate.

20 Claims, 5 Drawing Sheets

COMPENSATED LIQUID CRYSTAL DISPLAY OF THE BEND MODE

FIELD OF THE INVENTION

The invention relates to a compensated liquid crystal display of the bend mode and to a compensator for use in an LCD of the bend mode.

BACKGROUND AND PRIOR ART

Liquid Crystal displays (LCD) of the OCB (optically compensated bend) are based on a birefringence effect and comprise a liquid crystal (LC) layer with a bend structure. The bend cell, also known as pi-cell, was first proposed by P. Bos et al., SID 83 Digest, 30 (1983) for an electrically controllable half-wave plate, whereas the OCB mode for displays was described by Y. Yamaguchi, T. Miyashita and T. Uchida, SID 93 Digest, 277 (1993), followed by papers of T. Miyashita et al. in, inter alia, Proc. Eurodisplay, 149 (1993), J. Appl. Phys. 34, L177 (1995), SID 95 Digest, 797 (1995), and C.-L. Kuo et al., SID 94 Digest, 927 (1994). An OCB cell typically comprises an LC cell with bend alignment and an LC medium with positive dielectric anisotropy $\Delta\epsilon$. Furthermore, OCB displays as reported in the above papers comprise one or more birefringent optical retardation films to eliminate light leakage by the bend cell in the black state. OCB displays bear several advantages like for example a wider viewing angle and shorter switching times than conventional LC displays based on twisted nematic (TN) cells. They are therefore a candidate for video-rate applications such as LCD televisions. Television applications require large display areas and hence wide viewing angles.

Usually an OCB mode display requires optical compensation films to provide both on-axis contrast and wide viewing angles.

Compensators comprising polymerised LC materials have been suggested in prior art. For example, P. Van de Witte et al. SID 97, pp. 687-690 and U.S. Pat. No. 5,619,352 disclose compensators with A plate, O plate and C plate symmetry and combinations thereof for viewing angle compensation of TN-LCDs, wherein the compensation films may comprise polymerised calamitic LC material with splayed or planar orientation. WO 01/20393 discloses combinations of splayed, planar and highly twisted polymerised LC films with optical A plate, O plate and negative C plate symmetry for viewing angle compensation of LCDs. However, it has turned out that these compensators, when used in LCDs of the OCB type, still do not show satisfying performance and in particular give insufficient viewing angle compensation.

K. Vermeirsch et al. IDRC 2000, poster 56A discloses a compensated OCB-LCD comprising a combination of anti-parallel aligned, splayed and planar compensators orientated perpendicular to the OCB cell, however, this combination only yielded a narrow viewing angle.

US 2002/0063828 discloses optical compensation films made from discotic LC materials for use in LCDs. However, the dispersion mismatch between the discotic compensator and the calamitic LC in the switchable display cell produces colouration.

One aim of the present invention is to provide a compensator for an LCD of the OCB or pi-cell mode that improves the optical performance of the LCD, in particular the contrast at wide viewing angles, is easy to manufacture, and allows economic fabrication even at large scales.

Another aim of this invention is to provide an advantageous use of the compensator according to this invention.

A further aim of this invention relates to OCB and pi-cell LCDs comprising an inventive compensator which show advantageous properties such as good contrast, reduced colour shift and wide viewing angles.

Other aims of the present invention are immediately evident to the person skilled in the art from the following detailed description.

The above aims can be achieved by providing compensators and LCDs according to the present invention.

DEFINITION OF TERMS

In connection with polarisation, compensation and retardation layers, films or plates as described in the present application, the following definitions of terms as used throughout this application are given.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. Liquid crystal (LC) compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

For the sake of simplicity, the term 'liquid crystal material' is used hereinafter for both liquid crystal materials and mesogenic materials, and the term 'mesogen' is used for the mesogenic groups of the material.

The term 'director' is known in prior art and means the preferred orientation direction of the long molecular axes (in case of calamitic compounds) or short molecular axis (in case of discotic compounds) of the mesogens in a liquid crystal material.

The term 'planar structure' or 'planar orientation' refers to a film wherein the optical axis is substantially parallel to the film plane.

The term 'homeotropic structure' or 'homeotropic orientation' refers to a film wherein the optical axis is substantially perpendicular to the film plane, i.e. substantially parallel to the film normal.

The terms 'tilted structure' or 'tilted orientation' refers to a film wherein the optical axis is tilted at an angle $\theta$ between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

The tilt angle of a splayed film hereinafter is given as the average tilt angle $\theta_{ave}$, unless stated otherwise.

The average tilt angle $\theta_{ave}$ is defined as follows $$\theta_{ave} = \frac{\sum_{d'=0}^{d} \theta'(d')}{d}$$

wherein $\theta'(d')$ is the local tilt angle at the thickness d' within the film, and d is the total thickness of the film.

In planar, homeotropic and tilted optical films comprising uniaxially positive birefringent liquid crystal material with uniform orientation, the optical axis of the film is given by the director of the liquid crystal material.

The term 'helically twisted structure' relates to a film comprising one or more layers of liquid crystal material wherein the mesogens are oriented with their main molecular axis in a preferred direction within molecular sublayers, said preferred orientation direction in different sublayers being twisted at an angle $\phi$ around a helix axis. The term 'helically twisted structure with planar orientation' means a film with helically twisted structure as described above, wherein the helix axis is substantially perpendicular to the film plane, i.e. substantially parallel to the film normal.

The term 'A plate' refers to an optical retarder utilizing a layer of uniaxially birefringent material with its extraordinary axis oriented parallel to the plane of the layer.

The term 'C plate' refers to an optical retarder utilizing a layer of uniaxially birefringent material with its extraordinary axis perpendicular to the plane of the layer.

The term 'O plate' refers to an optical retarder utilizing a layer of uniaxially birefringent material with its extraordinary axis oriented at an oblique angle with respect to the plane of the layer.

In A-, C- and O-plates comprising optically uniaxial birefringent liquid crystal material with uniform orientation, the optical axis of the film is given by the direction of the extraordinary axis.

An A plate or C plate comprising optically uniaxial birefringent material with positive birefringence is also referred to as '+A/C plate' or 'positive A/C plate'. An A plate or C plate comprising a film of optically uniaxial birefringent material with negative birefringence is also referred to as '−A/C plate' or 'negative A/C plate'.

A retardation film with positive or negative birefringence is also shortly referred to as 'positive' or 'negative' retardation film, respectively.

A transmissive or transflective LCD according to the present invention preferably contains a polariser and an analyser, which are arranged on opposite sides of the arrangement of LC layer and birefringent layer.

Polariser and Analyser are jointly referred to as "polarisers" in this application.

SUMMARY OF THE INVENTION

The present invention relates to a compensator for use in a liquid crystal display (LCD) of the bend mode, in particular of the optically compensated bend (OCB) or pi-cell mode, characterized in that it comprises at least one retardation film having an extraordinary axis substantially parallel to the film plane (A plate), at least one retardation film having an extraordinary axis tilted at an angle $\theta$ between 0° and 90° relative to the film plane (O plate), and at least one retardation film having an optical axis substantially perpendicular to the film plane and having a refractive index in the direction perpendicular to the film plane that is smaller than the refractive indices in the directions parallel to the film plane (negative C plate).

The invention further relates to an LCD of the OCB or pi-cell mode comprising at least one compensator according to the invention as described above and below, preferably at least one compensator on each side of the switchable LC cell of the LCD.

The invention further relates to an LCD comprising a switchable LC cell with a layer of an LC medium having bend alignment and positive dielectric anisotropy $\Delta\epsilon$ between two plane parallel electrodes at least one of which is transparent to incident light, and at least one polariser or two polarisers sandwiching the LC layer and the electrodes, characterized in that the LCD comprises on each side of the LC cell at least one compensator according to the invention as described above and below.

DETAILED DESCRIPTION OF THE INVENTION

The compensator according to this invention comprises specific combinations of individual compensation films, preferably made from calamitic RMs, that provide good viewing angle performance with improved chromaticity. These specific combinations of films cancel both on and off-axis retardation of an OCB cell and compensate for the polariser light leakage.

One advantage of the compensator of the present invention is that it only has splayed regions in the quadrants parallel with the OCB cell. In contrast, for example the compensator of prior art as described in K. Vermeirsch et al. IDRC 2000, poster 56A uses calamitic films that have a splayed region (LC or RM) in each azimuthal quadrant.

Another advantage of the compensator of the present invention is that, by using a combination of splayed and planar films of calamitic RMs, which have similar dispersion to the calamitic LC mixture as used in typical OCB display cells, the splayed regions in the OCB display cell are cancelled. In contrast, for example a compensator as described in U.S. Pat. No. 2002/0063828 uses compensation films made from discotic LC materials, which show a dispersion mismatch with the calamitic LCs in the display cell, and thus produce undesired colouration.

The film combinations according to the present invention compensate for both the polariser light leakage and the retardation of the LC in the OCB display cell in the dark state.

The compensator according to the present invention comprises one or more, preferably one or two, A plates, very preferably positive A plates, one or more, preferably one, O plates, preferably positive O plates, and one or more, preferably one, negative C plates on each side of the LC cell.

Suitable optical films for use as A plate retarders are known in prior art, like for example uniaxially stretched polymer films such as polyethyleneterephthalate (PET), polyvinylalcohol (PVA) or polycarbonate (PC) films.

Suitable optical films for use as O plate retarders are known in prior art, and can be obtained for example by oblique vapour deposition of a thin film, e.g. of an inorganic material such as $Ta_2O_5$, as described for example in U.S. Pat. No. 5,196,953 and WO 96/10773. It is also possible to use as O plate an LC film as described in WO 96/10770, which is prepared from a polymerisable LC material with a smectic A or C phase and a nematic phase at higher temperatures, by applying the LC material in its nematic phase onto a substrate optionally covered with an alignment layer of obliquely deposited SiO, lowering the temperature into the smectic C phase of the material so that the LC material adopts its naturally tilted smectic C structure, and fixing the tilted structure by polymerisation of the LC material.

Suitable optical films for use as negative C plate retarders are known in prior art, like for example stretched or uniaxially compressed plastic films like DAC or TAC as described for example in U.S. Pat. No. 4,701,028, inorganic thin films obtained by physical vapour deposition as described for example in U.S. Pat. No. 5,196,953, or negatively birefringent polyimide films as described for example in U.S. Pat. No. 5,480,964 and U.S. Pat. No. 5,395,918.

Especially preferred are A, O and C plates made of polymerised or crosslinked LC material.

The A plate retardation film preferably comprises a polymerised LC material with planar structure as described for example in WO 98/04651, the entire disclosure of which is incorporated by reference.

The tilted or splayed O plate retarder preferably comprises a polymerised liquid crystal material with tilted or splayed structure, as described for example in U.S. Pat. No. 5,619,352, WO 97/44409, WO 97/44702, WO 97/44703 or WO 98/12584, the entire disclosure of which is incorporated by reference.

As a negative C plate retarder preferably a film is used that comprises polymerised chiral LC, in particular cholesteric LC (CLC) material with a short pitch and a reflection in the UV range, such as a UVCLC film or highly twisted A plate as described for example in GB 2,315,072, WO 01/20393 and WO 01/20394, the entire disclosure of which is incorporated by reference. A UVCLC film as described in these documents, although it does not have an extraordinary axis oriented perpendicular to the film plane, has the optical properties of a negative C plate.

Especially preferred are the following embodiments
the compensator comprises an O plate wherein the tilt angle varies in a direction perpendicular to the film plane (splayed O plates),
the compensator comprises one O plate,
the compensator comprises two A plates,
the compensator comprises one negative C plate,
the compensator is positioned in the display such that one of the A plates is situated on the side of the compensator facing away from the switchable LC cell. This A plate is hereinafter also referred to as 'outer A plate', with the other A plate(s) hereinafter being referred to as 'inner A plate(s)',
one compensator is positioned on each side of the switchable LC cell of the display such that the stack of individual A, O and C plates in both compensators is symmetrical with respect to the LC cell,
the A plate, O plate and/or C plate comprise a polymerised or crosslinked LC material,
the A plate comprises a polymerised or crosslinked achiral LC material with planar orientation,
the O plate comprises a polymerised or crosslinked achiral LC material with tilted or splayed orientation,
the negative C plate comprises a polymerised or crosslinked cholesteric LC (CLC) material with helically twisted structure and planar orientation having a reflection wavelength below the visible range of light,
the helical pitch of the CLC material in the negative retardation film is smaller than 250 nm,
the thickness of the outer A plate is from 0.3 to 2 μm, preferably from 0.6 to 1.2 μm,
the thickness of the inner A plate is from 0.5 to 2 μm, preferably from 0.7 to 1.3 μm,
the thickness of the O plate is from 0.5 to 2.5 μm, preferably from 0.7 to 1.5 μm,
the thickness of the negative C plate is from 2 to 5 μm, preferably from 3.5 to 4.5 μm,
Preferably the optical retardation of the individual A, O and C plates of the compensator are selected such that the following equations are fulfilled $$d_A \cdot \Delta n_A / d_{LC} \cdot \Delta n_{LC} = 0.115 \pm 0.1, \text{ preferably } 0.115 \pm 0.05, \text{ very preferably } 0.115 \pm 0.015$$

$$d_O \cdot \Delta n_O / d_{LC} \cdot \Delta n_{LC} = 0.129 \pm 0.1, \text{ preferably } 0.129 \pm 0.05, \text{ very preferably } 0.129 \pm 0.020$$

$$d_C \cdot \Delta n_C / d_{LC} \cdot \Delta n_{LC} = 0.245 \pm 0.2, \text{ preferably } 0.245 \pm 0.1, \text{ very preferably } 0.245 \pm 0.05$$

wherein
d is the layer or film thickness,
Δn is the birefringence,
$d_A \cdot \Delta n_A$ is the retardation of the A plate, and preferably relates to the inner A plate,
$d_O \cdot \Delta n_O$ is the retardation of the O plate,
$d_C \cdot \Delta n_C$ is the retardation of the of the negative C plate, and
$d_{LC} \cdot \Delta n_{LC}$ is the retardation of the switchable LC cell of the display.

The optical retardation $d_A \cdot \Delta n_A$ of the outer A plate is preferably from 70 to 110 nm, very preferably from 80 to 100 nm, most preferably approximately 90 nm, wherein d is the film thickness and Δn is the birefringence.

The optical retardation d·Δn of the −C plate is preferably from 150 to 300 nm, very preferably from 210 to 260 nm, for a thickness of the LC cell of approximately 5 μm.

The optical retardation d·Δn of the O plate is preferably from 60 to 230 nm, very preferably from 100 to 140 nm, for a thickness of the LC cell of approximately 5 μm.

The optical retardation d·Δn of the inner A plate is preferably from 50 to 200 nm, very preferably from 90 to 130 nm, for a thickness of the LC cell of approximately 5 μm.

FIG. 1 exemplarily depicts an OCB display comprising a compensator according to a preferred embodiment of the present invention with four individual compensation films, preferably calamitic LC films, on either side of the switchable LC cell (9), including two planar A plates (1, 8) and (4, 5), one O plate (3, 6) which is preferably a splayed O plate, and one negative C plate (2, 7). The LC cell and the compensators are sandwiched by two linear polarisers (11, 12).

The outer planar A plate (1, 8) can optionally be removed to produce a simpler but lower performance compensator. The other A, O and C plates are all required to achieve good viewing angle.

The films are preferably kept in a configuration that is symmetrical with respect to the LC cell of the display, so that film 1=8, 2=7, 3=6, 4=5, to maintain viewing angle symmetry about normal incidence.

The negative C plate (2, 7) and the outer planar A plate (1, 8) can be combined into a single biaxial film with similar optical performance. However, to allow the use of calamitic LC materials with similar dispersion in the other films and/or the LC cell these films are preferably kept as separate uniaxial retarders.

In all possible and preferred compensator configurations according to the present invention, the outer planar A plates (1, 8) preferably remain adjacent to the polarisers (11, 12) with their optic axis along the polariser transmission direction.

The splayed O plates (3, 6) are preferably aligned antiparallel to the alignment of LC molecules at the adjacent surface of the LC cell, as shown in FIG. 1. The inner planar A plates (4, 5) are preferably aligned perpendicular to the LC molecules at the adjacent surface of the LC cell and to the splayed film, as shown in FIG. 1.

Further preferred configurations of the individual films in a compensator according to the present invention are shown in table 1. Therein, LC denotes the liquid crystal cell, O denotes a tilted or splayed O plate, A denotes a planar A plate, and –C denotes a negative C plate. For the case where the O plate is a splayed O plate, the arrow is denoting the preferred direction of increasing tilt angle.

For sake of simplicity, the polarisers are omitted in table 1. A display for practical applications will, however, further comprise a pair of polarisers sandwiching the stack as shown in table 1.

In the stack formats shown in table 1 the single retarder components are arranged symmetrically, therefore incoming light may enter the stack from either side.

The single A, O and C plates in a compensator according to the present invention and also in the stacks shown in table 1 can be laminated directly onto each other or separated by a transparent intermediate film, like for example a TAC film.

In the stacks shown in table 1, the outer A plates may also be omitted.

TABLE 1

Preferred compensator stacks in inventive displays

| | | | | | | | | |
|---|---|---|---|---|---|---|---|---|
| 1) A | -C | ←O | A | LC | A | O→ | -C | A |
| 2) A | -C | A | ←O | LC | O→ | A | -C | A |
| 3) A | -C | O→ | A | LC | A | ←O | -C | A |
| 4) A | -C | A | O→ | LC | ←O | A | -C | A |
| 5) A | ←O | -C | A | LC | A | -C | O→ | A |
| 6) A | A | -C | ←O | LC | O→ | -C | A | A |
| 7) A | O→ | -C | A | LC | A | -C | ←O | A |
| 8) A | A | -C | O→ | LC | ←O | -C | A | A |
| 9) A | A | ←O | -C | LC | -C | O→ | A | A |
| 10) A | ←O | A | -C | LC | -C | A | O→ | A |
| 11) A | A | O→ | -C | LC | -C | ←O | A | A |
| 12) A | O→ | A | -C | LC | -C | A | ←O | A |

Especially preferred is configuration 1.

In a preferred embodiment of the present invention the individual A, O and C plates of the compensator comprise a polymerised LC material, the optical dispersion (the wavelength dependence of the birefringence) of which is matched to that of the LC material in the switchable display cell.

For example, FIG. 2 shows birefringence wavelength dispersions $\Delta n(\lambda)/\Delta n(550\ nm)$, wherein $\Delta n(\lambda)$ is the birefringence $\Delta n$ at the wavelength $\lambda$ and $\Delta n(550\ nm)$ is the birefringence at 550 nm, for conventional LC media for OCB display use having a high (A) and a medium (B) dispersion, and for a typical polymerised LC film (C).

FIG. 3 shows the on-axis colour versus applied voltage for the LC media (A) and (B), and for an LC medium having a similar dispersion as the polymerised LC film (C), in an OCB cell combined with a compensator according to configuration 1. For optimum on-axis achromaticity, FIG. 3 shows that the wavelength dispersion of the LC in the cell should be matched to the polymerised LC films.

An LCD according to the present invention may further comprise one or more further optical components such as polarisers or compensation or retardation films, like for example one or more quarter wave retardation films (QWF, $\lambda/4$ films) or half wave retardation films (HWF, $\lambda/2$ films), positive or negative A, O or C plates or retardation films with twisted, homeotropic, planar, tilted or splayed structure. Particularly preferred are optical films comprising polymerised or crosslinked LC material. Homeotropic LC films are described for example in WO 98/00475.

The LCD according to the present invention may be a reflective or transmissive display, and may further comprise a light source, like a conventional backlight, or a reflective layer on the side of the LC cell opposite to that of the first linear polariser. In case of a reflective display with a reflective layer on one side of the LC cell the second linear polariser may be omitted.

The negative and positive retarders and A, O and C plates of the compensator according to the present invention are preferably prepared from a polymerisable LC material by in-situ polymerisation. In a preferred method of preparation the polymerisable LC material is coated onto a substrate, oriented into the desired orientation and subsequently polymerised for example by exposure to heat or actinic radiation as described for example in WO 01/20394, GB 2,315,072 or WO 98/04651.

Alternatively it is possible to prepare the retardation films from a readily synthesized LC polymer that is applied onto a substrate, for example at a temperature above its glass transition temperature or its melting point, or from solution e.g. in an organic solvent, aligned into the desired orientation, and solidified for example by evaporating the solvent or by cooling below the glass temperature or melting point of the LC polymer. If for example a LC polymer with a glass temperature that is higher than ambient temperature is used, evaporation of the solvent or cooling leaves a solid LC polymer film. If for example an LC polymer with a high melting point is used, the LC polymer can be applied as a melt onto the substrate which solidifies upon cooling. LC side chain polymers or LC main chain polymers can be used, preferably LC side chain polymers. The LC polymer should preferably be selected such that its glass transition or melting temperature is significantly higher than the operating temperature of the retarder. For example, LC side chain polymers comprising a polyacrylate, polymethacrylate, polysiloxane, polystyrene or epoxide backbone with laterally attached mesogenic side chains can be used. The LC polymer may also comprise side chains with reactive groups that can be crosslinked after or during evaporation of the solvent to permanently fix the orientation. The LC polymer may also be subjected to mechanical or heat treatment after application to the substrate to improve alignment. The above methods and suitable materials are known to those skilled in the art.

The compensator according to the present invention is especially suitable for use in OCB and pi-cell LCDs, including conventional OCB, R-OCB (reflective OCB), HAN (hybrid aligned nematic) and pi-cell ($\pi$-cell) displays.

However, the compensator according to the present invention can also be used for compensation of other types of LCDs, like for example those of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are ECB, TN, STN and HTN displays.

The following examples should illustrate the present invention without limiting it.

EXAMPLE 1

Figure 1:
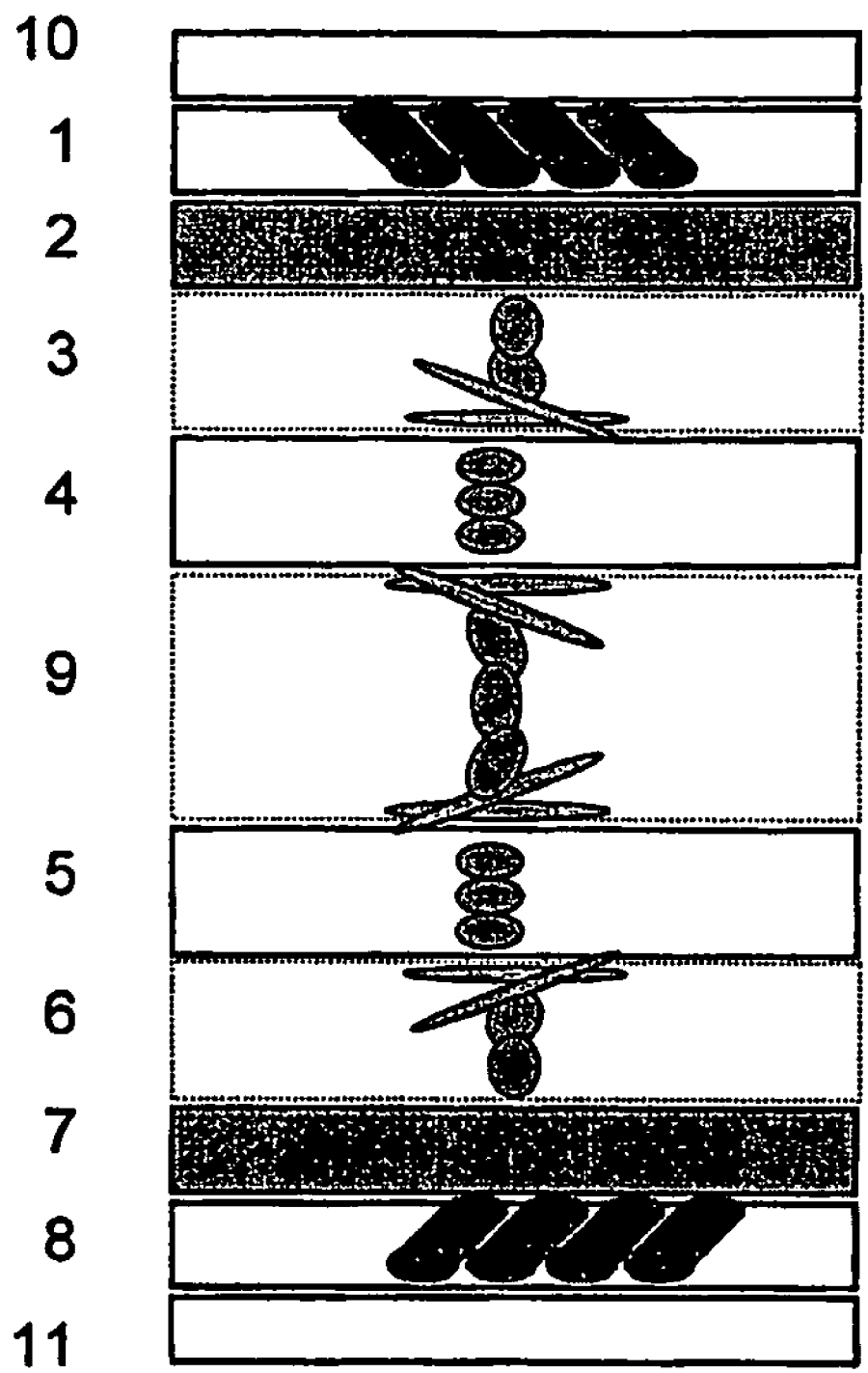
FIG. 1: illustrates an OCB display.
Figure 2:
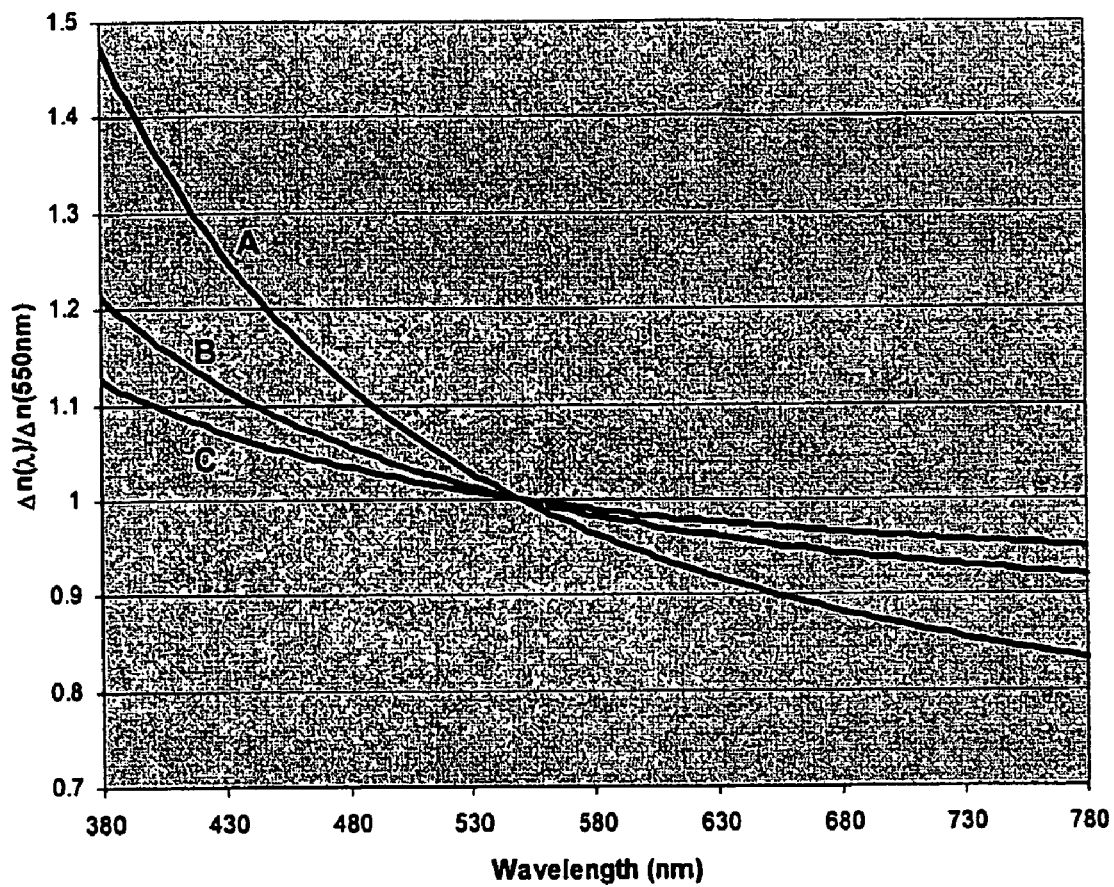
FIG. 2: illustrates birefringence wavelength dispersions.
Figure 3:
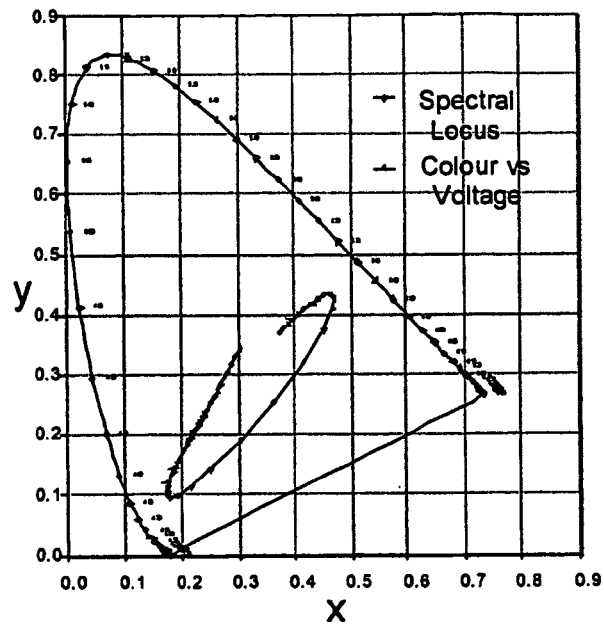
FIG. 3: illustrates the on-axis color versus applied voltage.
Figure 3:
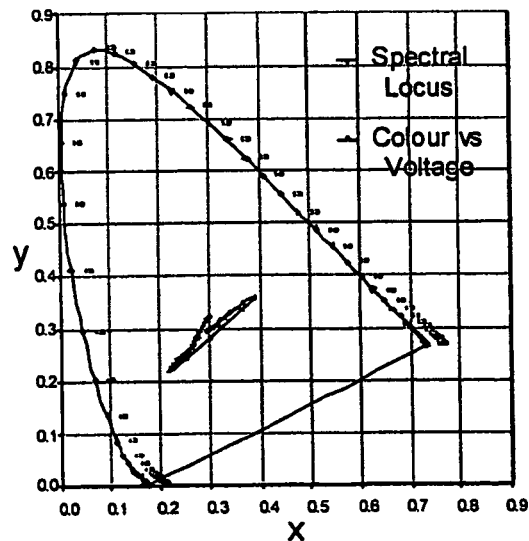
Figure 3:
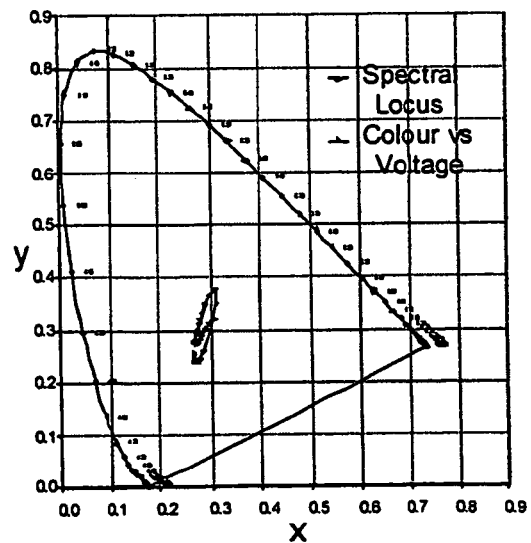

An OCB display comprises a compensator with a configuration as shown in FIG. 1.

The on axis contrast is achieved by matching the on-axis retardation of the combined individual films of the compensator with that of LC in the dark state. A series of film combinations having different retardation values were found which fulfilled this requirement.

Figure 4:
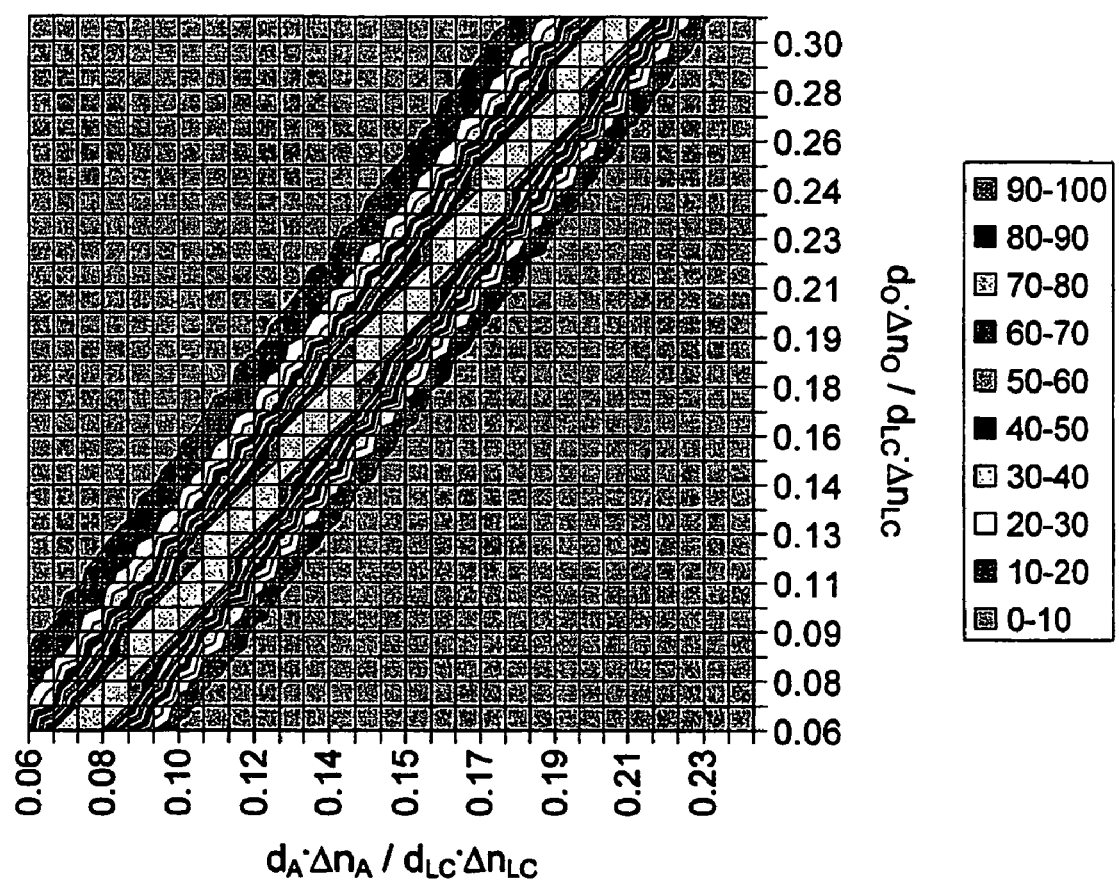
FIG. 4: illustrates the variation of the on-axis contrast with the variation of the retardation relative to the retardation of the LC cell.

FIG. 4 shows the variation of the on-axis contrast with the variation of the retardation $d_A \cdot \Delta n_A$ and $d_O \cdot \Delta n_O$ of the inner planar A plate (4, 5) and the splayed O plate (3, 6), respectively, relative to the retardation $d_{LC} \cdot \Delta n_{LC}$ of the LC cell. The splayed O plate (3, 6) has a linear tilt profile varying from 4 degrees tilt at the planar surface to 75 degrees tilt at the homeotropic surface. The high contrast combinations shown in FIG. 4 are thus optimized combinations of the splayed O plate (3, 6) and inner planar A plate (4, 5).

Each combination of A plate and O plate that achieves good on-axis contrast has a different off-axis retardation profile. The viewing angle performance is therefore different for each film combination. An optimum combination of A plate (4, 5) and O plate (3, 6) has been found for the following retardation values relative to the LC cell:

$$d_A \cdot \Delta n_A / d_{LC} \cdot \Delta n_{LC} = 0.115 \pm 0.015$$

$$d_O \cdot \Delta n_O / d_{LC} \cdot \Delta n_{LC} = 0.129 \pm 0.020$$

In addition, for this combination of A and O plate, an optimised negative C plate (2, 7) has been found for the following retardation values relative to the LC cell $$d_C \cdot \Delta n_C / d_{LC} \cdot \Delta n_{LC} = 0.245 \pm 0.05$$

The optimum retardation for the outer planar A plate (1, 8) is independent of the retardation of the LC cell and is 90 nm±15 nm.

Figure 5:
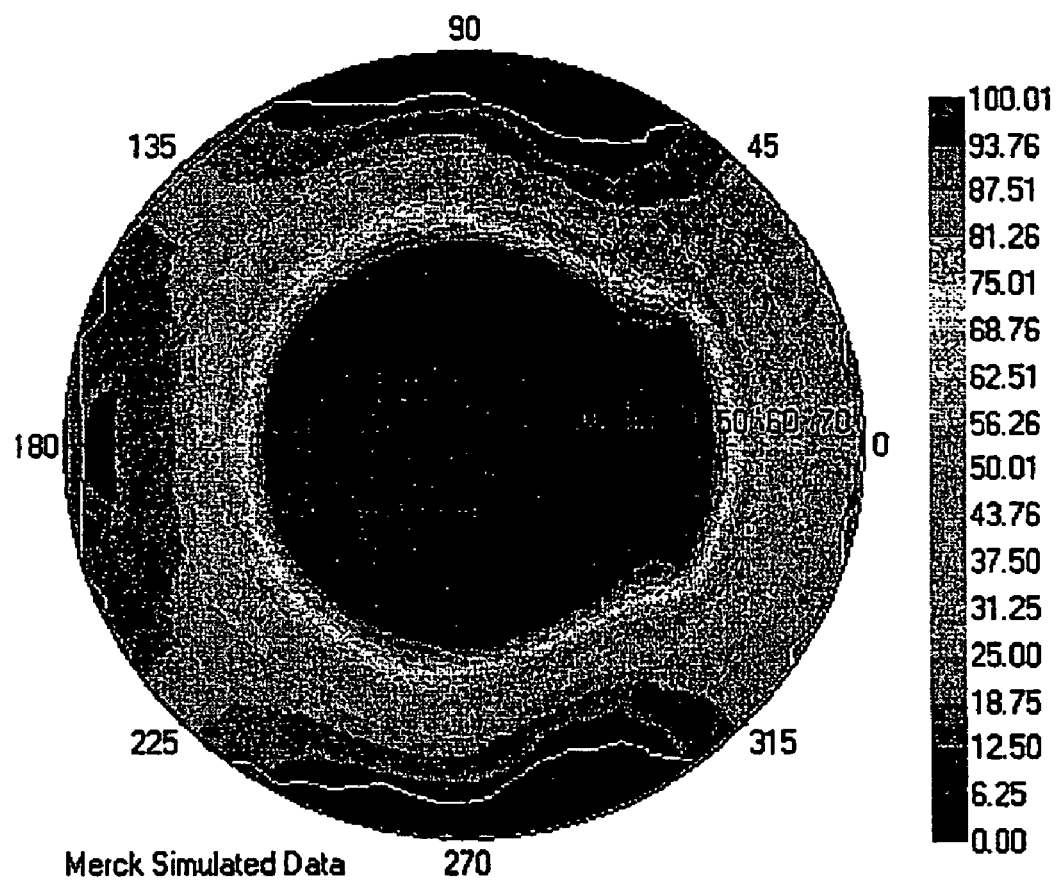
FIG. 5: illustrates the isocontrast plot calculated for a film combination.

The isocontrast plot calculated for this film combination is shown in FIG. 5.

The invention claimed is:

1. A compensator for use in a liquid crystal display (LCD) of the bend mode, comprising
   at least one retardation film having a film plane and an extraordinary axis substantially parallel to the film plane thereof (A plate),
   at least one retardation film having a film plane and an extraordinary axis tilted at an angle θ between 0° and 90° relative to the film plane thereof (O plate), and
   at least one retardation film having a film plane and an optical axis substantially perpendicular to the film plane thereof and having a refractive index in the direction perpendicular to the film plane thereof that is smaller than the refractive indices in the directions parallel to the film plane thereof (negative C plate),
   wherein the optical retardation of the individual A, O and C plates of the compensator are selected such that the following equations are fulfilled $$d_A \cdot \Delta n_A / d_{LC} \cdot \Delta n_{LC} = 0.115 \pm 0.1$$

$$d_O \cdot \Delta n_O / d_{LC} \cdot \Delta n_{LC} = 0.129 \pm 0.1$$

$$d_C \cdot \Delta n_C / d_{LC} \cdot \Delta n_{LC} = 0.245 \pm 0.2$$

wherein d is the layer or film thickness, Δn is the birefringence, $d_A \cdot \Delta n_A$ is the retardation of the A plate, $d_O \cdot \Delta n_O$ is the retardation of the O plate, $d_C \cdot \Delta n_C$ is the retardation of the of the negative C plate, and $d_{LC} \cdot \Delta n_{LC}$ is the retardation of the switchable LC cell of the display.

2. A compensator according to claim 1, comprising two A plates, one negative C plate and one O plate having a tilt angle that varies in a direction perpendicular to the film plane (splayed O plate).

3. A compensator according to claim 1, wherein the A plate and/or O plate and/or C plate comprise(s) polymerized or crosslinked liquid crystal material.

4. A compensator according to claim 1, wherein the optical retardation $d_A \cdot \Delta n_A$ of the A plate is 70 to 110 nm.

5. A compensator according to claim 1, which is positioned in the display such that one of the A plates ('outer A plate') is situated on the side of the compensator facing away from the switchable LC cell.

6. An LCD of the optically compensated bend (OCB) or pi-cell mode, comprising at least one compensator according to claim 1.

7. An LCD according to claim 6, wherein one of said compensators is positioned on each side of the switchable LC cell of the LCD such that the stack of individual A, O and C plates in both compensators is symmetrical with respect to the LC cell.

8. An LCD according to claim 7, wherein the position of the individual films in the compensator is selected from the following configurations 1) to 12)

| | | | | | | | | | |
|---|---|---|---|---|---|---|---|---|---|
| 1) | A | −C | ←O | A | LC | A | O→ | −C | A |
| 2) | A | −C | A | ←O | LC | O→ | A | −C | A |
| 3) | A | −C | O→ | A | LC | A | ←O | −C | A |
| 4) | A | −C | A | O→ | LC | ←O | A | −C | A |
| 5) | A | ←O | −C | A | LC | A | −C | O→ | A |
| 6) | A | A | −C | ←O | LC | O→ | −C | A | A |
| 7) | A | O→ | −C | A | LC | A | −C | ←O | A |
| 8) | A | A | −C | O→ | LC | ←O | −C | A | A |
| 9) | A | A | ←O | −C | LC | −C | O→ | A | A |
| 10) | A | ←O | A | −C | LC | −C | A | O→ | A |
| 11) | A | A | O→ | −C | LC | −C | ←O | A | A |
| 12) | A | O→ | A | −C | LC | −C | A | ←O | A | wherein A is a planar A plate,
O is a tilted or splayed O plate,
−C is a negative C plate,
LC is the switchable LC cell of the display, and
the arrows denote the direction of increasing tilt angle in a splayed O plate.

9. An LCD according to claim 8, wherein $$d_A \cdot \Delta n_A / d_{LC} \cdot \Delta n_{LC} = 0.115 \pm 0.015$$

$$d_O \cdot \Delta n_O / d_{LC} \cdot \Delta n_{LC} = 0.129 \pm 0.020$$

$$d_C \cdot \Delta n_C / d_{LC} \cdot \Delta n_{LC} = 0.245 \pm 0.05.$$

10. An LCD comprising a switchable LC cell with a layer of an LC medium having bend alignment and positive dielectric anisotropy Δε between two plane parallel electrodes, at least one of which is transparent to incident light, and at least one polarizer or two polarizers sandwiching the LC layer and the electrodes, comprising on each side of the LC cell at least one compensator according to claim 1.

11. A compensator according to claim 1, wherein $d_A \cdot \Delta n_A / d_{LC} \cdot \Delta n_{LC} = 0.115 \pm 0.05$.

12. A compensator according to claim 1, wherein $d_C \cdot \Delta n_C / d_{LC} \cdot \Delta n_{LC} = 0.115 \pm 0.015$.

13. A compensator according to claim 1, wherein $d_O \cdot \Delta n_O / d_{LC} \cdot \Delta n_{LC} = 0.129 \pm 0.05$.

14. A compensator according to claim 1, wherein $d_O \cdot \Delta n_O / d_{LC} \cdot \Delta n_{LC} = 0.129 \pm 0.020$.

15. A compensator according to claim 1, wherein $d_C \cdot \Delta n_C / d_{LC} \cdot \Delta n_{LC} = 0.245 \pm 0.1$.

16. A compensator according to claim 1, wherein $d_C \cdot \Delta n_C / d_{LC} \cdot \Delta n_{LC} = 0.245 \pm 0.05$.

17. A compensator according to claim 1, wherein $d_A \cdot \Delta n_A / d_{LC} \cdot \Delta n_{LC} = 0.115 \pm 0.05$ $d_O \cdot \Delta n_O / d_{LC} \cdot \Delta n_{LC} = 0.129 \pm 0.05$ $d_C \cdot \Delta n_C / d_{LC} \cdot \Delta n_{LC} = 0.245 \pm 0.1$.

18. An LCD of the optically compensated bend (OCB) or pi-cell mode, comprising at least one compensator according to claim 17.

19. A compensator according to claim 1, wherein $d_A \cdot \Delta n_A / d_{LC} \cdot \Delta n_{LC} = 0.115 \pm 0.015$ $d_O \cdot \Delta n_O / d_{LC} \cdot \Delta n_{LC} = 0.129 \pm 0.020$ $d_C \cdot \Delta n_C / d_{LC} \cdot \Delta n_{LC} = 0.245 \pm 0.05$.

20. An LCD of the optically compensated bend (OCB) or pi-cell mode, comprising at least one compensator according to claim 8.

\* \* \* \* \*

UNITED STATES PATENT AND TRADEMARK OFFICE
CERTIFICATE OF CORRECTION

PATENT NO. : 7,456,918 B2
APPLICATION NO. : 10/531590
DATED : November 25, 2008
INVENTOR(S) : Skjonnemand It is certified that error appears in the above-identified patent and that said Letters Patent is hereby corrected as shown below:

Column 11, line 9 reads "$d_C \cdot \Delta n_C / d_{LC} \cdot \Delta n_{LC} = 0.115 \pm 0.015$" should read -- $d_A \cdot \Delta n_A / d_{LC} \cdot \Delta n_{LC} = 0.115 \pm 0.015$ --.

Signed and Sealed this

Twenty-third Day of March, 2010

David J. Kappos
*Director of the United States Patent and Trademark Office*